(12) United States Patent
Harris

(10) Patent No.: US 7,693,368 B2
(45) Date of Patent: Apr. 6, 2010

(54) THREE COLOR DIGITAL GOBO SYSTEM

(75) Inventor: Jeremiah J Harris, New Windsor, NY (US)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 12/401,025

(22) Filed: Mar. 10, 2009

(65) Prior Publication Data

US 2009/0175577 A1 Jul. 9, 2009

Related U.S. Application Data

(63) Continuation of application No. 11/386,194, filed on Mar. 21, 2006, now Pat. No. 7,181,112, which is a continuation of application No. 10/995,612, filed on Nov. 22, 2004, now Pat. No. 7,020,370, which is a continuation of application No. 10/616,481, filed on Jul. 8, 2003, now Pat. No. 6,823,119, which is a continuation of application No. 09/771,953, filed on Jan. 29, 2001, now Pat. No. 6,588,944.

(51) Int. Cl.
   *G02B 6/26* (2006.01)
   *G02B 26/00* (2006.01)
   *G09F 13/00* (2006.01)

(52) U.S. Cl. .................. 385/31; 385/100; 385/115; 385/116; 385/88; 385/147; 385/901; 359/291; 362/231; 362/232; 362/551; 362/556; 362/293; 362/296.05

(58) Field of Classification Search .................. 385/88, 385/89, 92, 49, 115, 116, 14, 147, 901, 37, 385/100, 31; 359/291, 223, 224; 382/217, 382/220, 190; 348/241, 239, 246; 362/232, 362/556, 293, 296, 231, 551, 296.05

See application file for complete search history.

(56) References Cited

U.S. PATENT DOCUMENTS

| | | | |
|---|---|---|---|
| 5,053,765 A | 10/1991 | Sonehara et al. | 340/815.31 |
| 5,151,718 A * | 9/1992 | Nelson | 347/130 |
| 5,386,250 A * | 1/1995 | Guerinot | 348/770 |
| 5,774,174 A | 6/1998 | Hardie | 348/100 |
| 5,796,526 A * | 8/1998 | Anderson | 359/671 |
| 5,828,485 A | 10/1998 | Hewlett | 359/29.1 |
| 5,940,204 A | 8/1999 | Hewlett | 359/298 |
| 5,997,150 A * | 12/1999 | Anderson | 362/227 |
| 6,057,958 A | 5/2000 | Hunt | 359/291 |
| 6,188,933 B1 | 2/2001 | Hewlett et al. | 700/19 |
| 6,208,087 B1 | 3/2001 | Hughes et al. | 315/291 |
| 6,256,136 B1 | 7/2001 | Hunt | 359/291 |
| 6,331,756 B1 | 12/2001 | Belliveau | 315/316 |
| 6,536,922 B1 | 3/2003 | Hewlett et al. | 362/290 |
| 6,538,797 B1 | 3/2003 | Hunt | 359/291 |
| 6,588,944 B2 | 7/2003 | Harris | 385/88 |
| 6,605,907 B2 | 8/2003 | Belliveau | 315/294 |
| 6,617,792 B2 | 9/2003 | Hughes et al. | 315/32 |
| 6,823,119 B2 | 11/2004 | Harris | 385/100 |
| 6,891,656 B2 | 5/2005 | Hunt | 359/291 |
| 6,988,817 B2 | 1/2006 | Hewlett et al. | 362/321 |
| 7,020,370 B2 | 3/2006 | Harris | 385/100 |

(Continued)

*Primary Examiner*—Brian M Healy
(74) *Attorney, Agent, or Firm*—Law Ofc SC Harris

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

15 Claims, 2 Drawing Sheets

U.S. PATENT DOCUMENTS

| | | | |
|---|---|---|---|
| 2002/0181070 A1 | 12/2002 | Hewlett | 359/291 |
| 2005/0100289 A1 | 5/2005 | Harris | 385/100 |
| 2006/0177185 A1 | 8/2006 | Harris | 385/100 |
| 2009/0175577 A1* | 7/2009 | Harris | 385/31 |
| 2009/0244499 A1* | 10/2009 | Bartlett et al. | 353/99 |
| 2009/0262307 A1* | 10/2009 | Bartlett et al. | 353/31 |

* cited by examiner

THREE COLOR DIGITAL GOBO SYSTEM

CROSS-REFERENCE TO RELATED APPLICATIONS

This application is a continuation application of and claims priority to U.S. application Ser. No. 11/386,194, filed Mar. 21, 2006 now U.S. Pat. No. 7,181,122; which is a continuation application of U.S. application Ser. No. 10/995,612, filed Nov. 22, 2004, new U.S. Pat. No. 7,020,370; which is a continuation of U.S. application Ser. No. 10/616,481, filed Jul. 8, 2003, now U.S. Pat. No. 6,823,119; which is a continuation of U.S. application Ser. No. 09/771,953, filed Jan. 29, 2001, now U.S. Pat. No. 6,588,944.

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
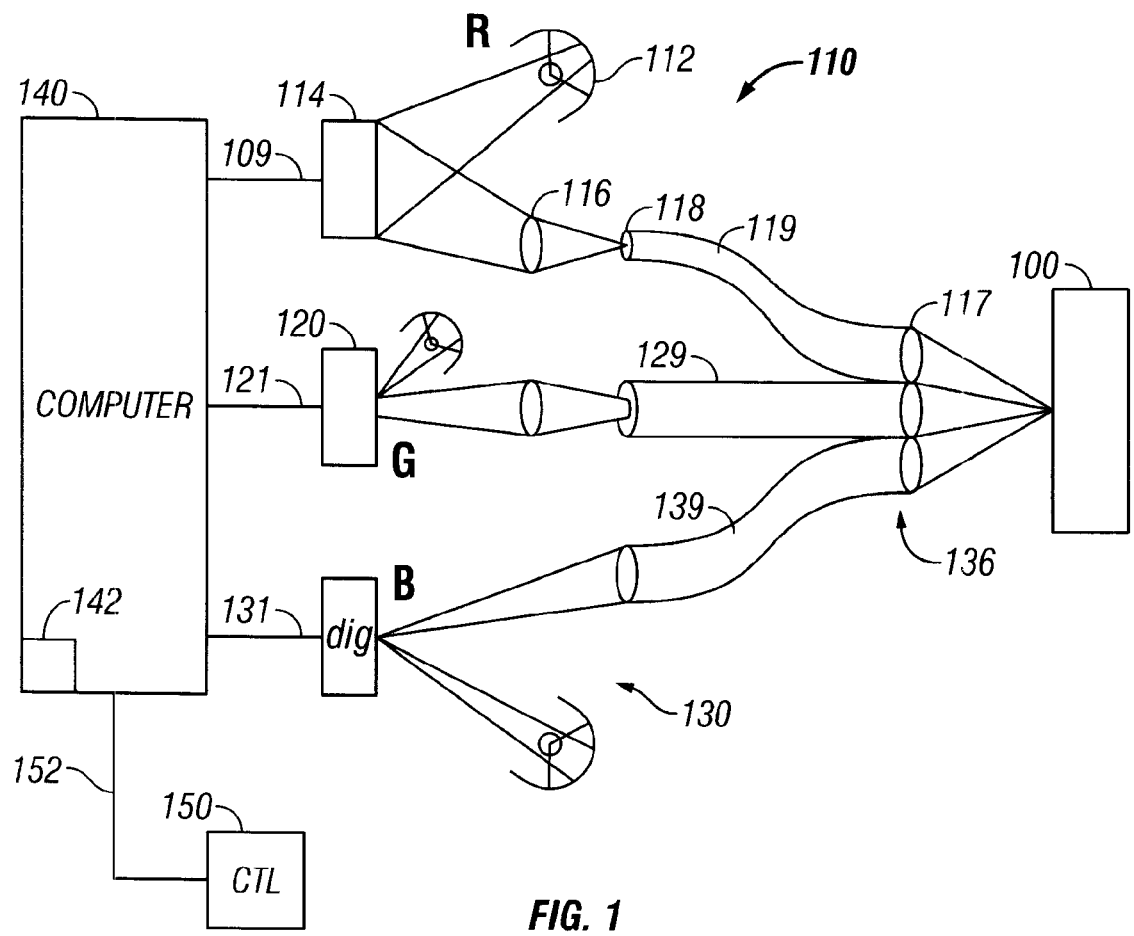
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117, and coupled towards the object 100. Analogously, the other lighting unit 120 focuses its light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
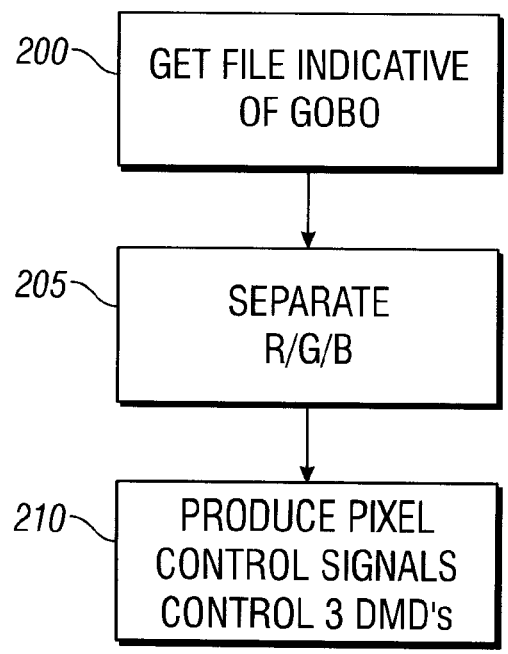
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
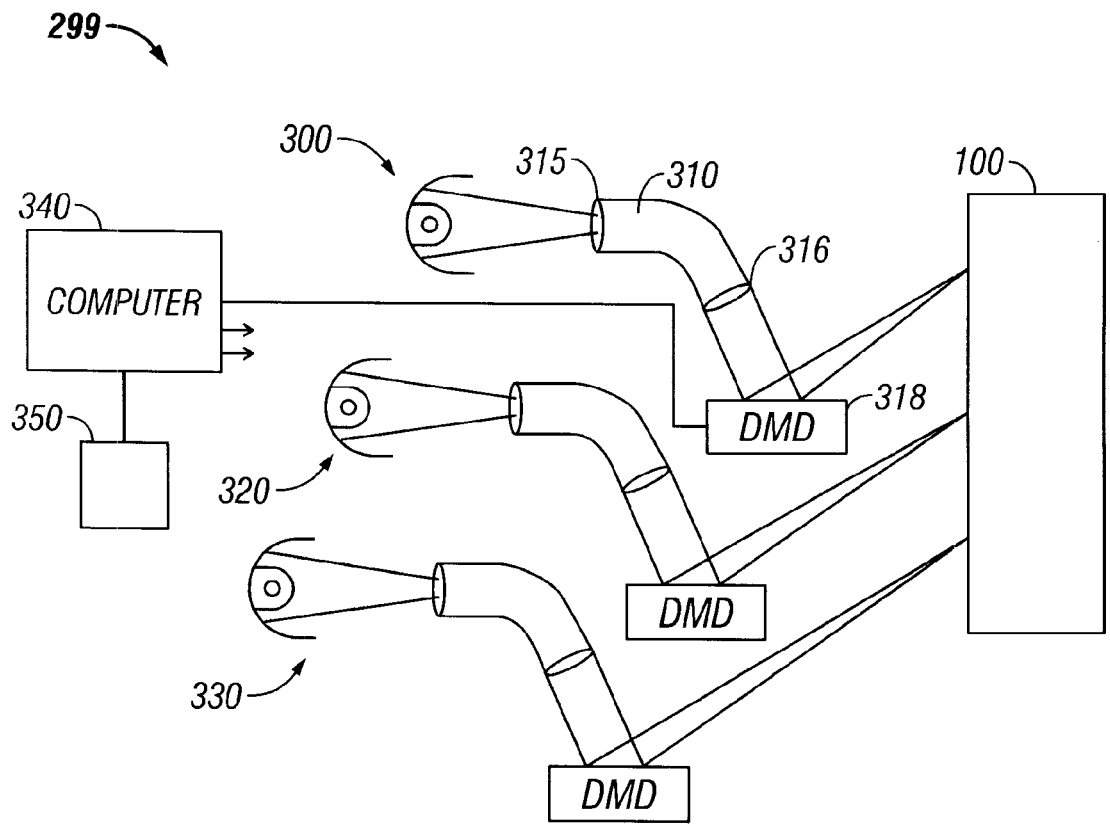
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
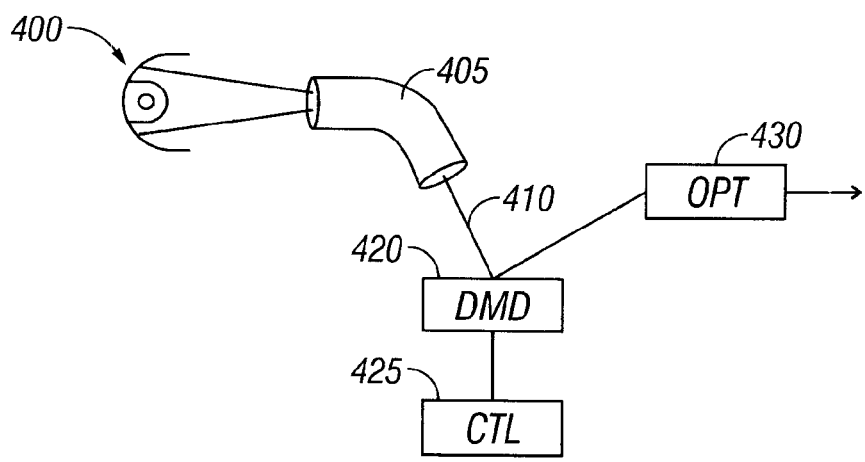
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A lighting assembly comprising:
a first lamp which produces a first light output, and directs said first light output towards an optical target;
a second light lamp which produces a second light output, said second light lamp which produces a second light output, said second light output being different than said first light output, and said second lamp directing said second light output towards said optical target;
a digital controllable light altering device, receiving said first light output, and digitally controlling a characteristic of said first light output, said digitally controllable system being located in an area of an output of said first light output, and in an area where an output of said digital controllable light altering, representing a digitally controlled light, is added with said second light output of said second lamp, wherein said optical area includes an optical waveguide therein, which directs said light output towards an object of lighting.

2. A light assembly as in claim 1, further comprising a third lamp, which produces a third light output, wherein said third light output is different than said first light output, and said third light output towards said optical area.

3. A lighting assembly as in claim 1, wherein said optical waveguide is an optical fiber.

4. A lighting assembly as in claim 1, wherein said optical waveguide receives light from both said first light output and from said second light output.

5. A lighting assembly as in claim 1, wherein said digitally controllable system includes a digital gobo.

6. A lighting a system as in assembly as in claim 5, wherein said digital gobo includes a digital mirror device which is digitally controllable.

7. A light assembly as in claim 1, wherein said first light output and said second light output have different intensities.

8. A light assembly as in claim 1, wherein said first lamp is controlled over a first channel, and said second lamp is controlled over a second channel.

9. A light assembly as in claim 8, wherein said first and second lamps have different colors.

10. A lighting device, comprising:
a first light source which produces a light output;
a digital gobo, in a path of said light output, which digitally controls said light output; and
a second light source, which produces a second light output, said second light source producing a light output which combines with said first light output,
wherein said second light source has a different intensity than said first light source;
an optical waveguide which combines output from said first and second light sources.

11. A lighting device as in claim 10, wherein said second light source has a different color than said first light source.

12. A lighting device as in claim 11, further comprising a third light source which produces a different color light than either said first or second light source.

13. A lighting device as in claim 12, wherein said first, second and third light sources are each primary colors.

14. A lighting device as in claim 10, wherein said optical wave guide is an optical fiber.

15. A lighting device as in claim 12, wherein each of said colors are controlled over different channels.

* * * * *